Patented July 24, 1951

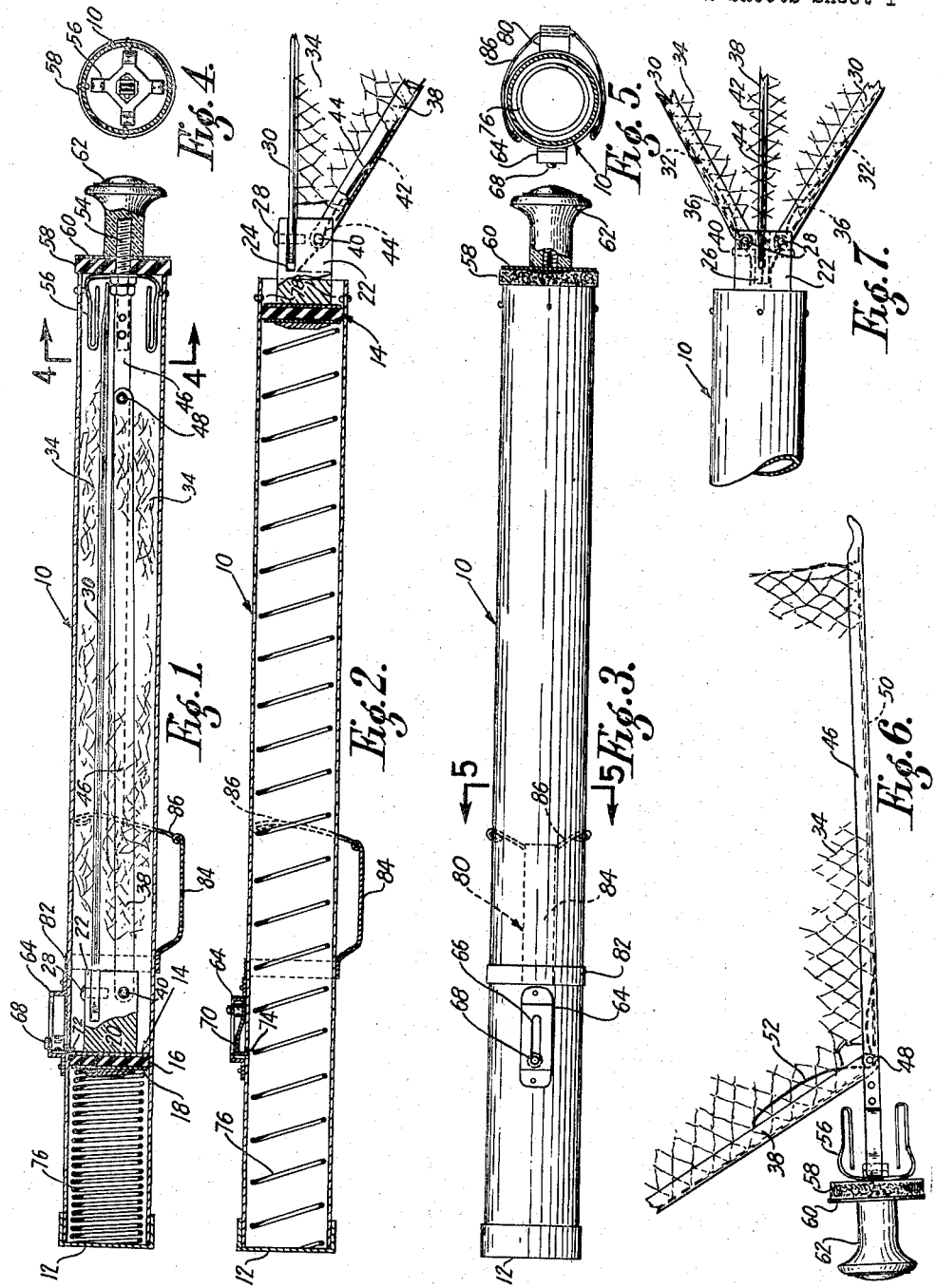

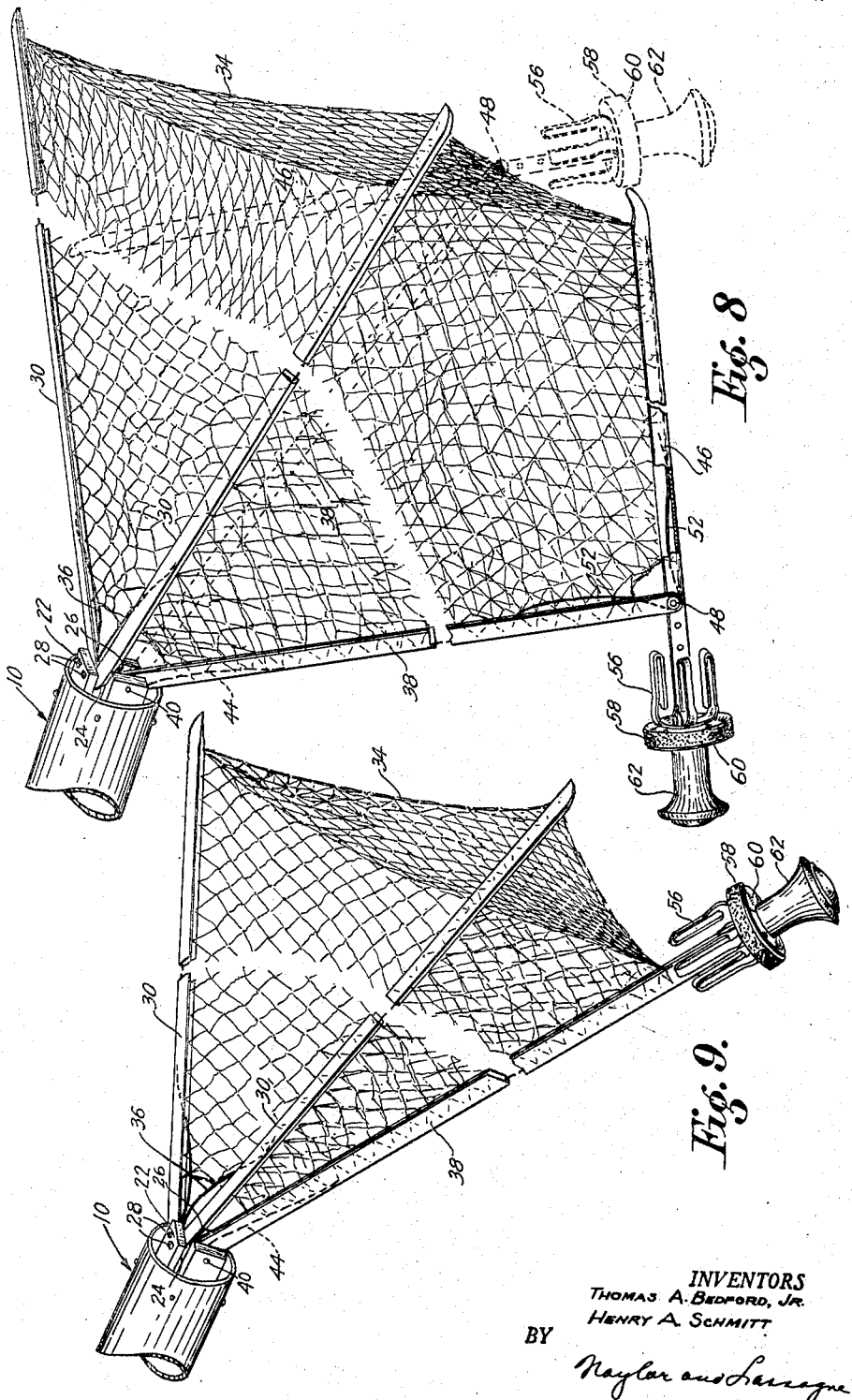

2,561,645

UNITED STATES PATENT OFFICE 2,561,645

RETRACTABLE FISH LANDING NET

Thomas A. Bedford, Detroit, Mich., and Henry A. Schmitt, Oakland, Calif.

Application December 8, 1947, Serial No. 790,340

6 Claims. (Cl. 43—12)

This invention relates to landing nets, and more particularly to a landing net wherein the net and frame support therefor are fully retractable within a cylindrical tube, or handle.

An obect of the invention is to provide a landing net, fully retractable and extensible with respect to a carrying handle, wherein the net supporting frame is comprised of a plurality of fingers distensible upon the movement of said net and frame outwardly of the handle to support the net in the optimum position for use in the landing of fish.

Another object of the invention is to provide a retractable landing net comprising a cylindrical handle, a net and supporting frame fully extensible and retractable with respect to the handle, and means embodied in the device to provide for floatability thereof irrespective of the position of the net with relation to the handle.

A further object of the invention is to provide a landing net having a distensible tripod frame operative upon the emergence of said frame from the handle to support the net in a position for use, and means associated with the members of said frame to facilitate the reintroduction of the net within the handle.

These and other objects of the invention will be apparent from the following description taken in conjunction with the drawings forming part of this specification, and in which:

Figure 1 is a view in section of the landing net, showing the elements thereof in their retracted position;

Figure 2 is a view in section of the landing net, showing the elements thereof in their extended position;

Figure 3 is a plan view of the landing net in the closed position;

Figure 4 is a view in section taken along lines 4—4 of Figure 1;

Figure 5 is a view in section taken along lines 5—5 of Figure 3;

Figure 6 is a view of a portion of the net frame structure showing said net frame in the extended position;

Figure 7 is a partial plan view of the landing net of Figure 2;

Figure 8 is a view in perspective of the net frame and net of the landing net; and Figure 9 is a view in perspective of a modification of the net frame.

Referring to the drawings for more specific details of the invention, 10 is a hollow cylindrical handle, or tube, having a permanent end closure cap 12. A piston indicated generally at 14 is disposed within the tube, said piston being comprised of a rubber disc 16 in wiping engagement with the inner surface of the tube, a backing disc 18 bonded thereto, a facing disc 20 also bonded to the disc 16, and an upright frame support member 22 crossed by slots in T-shape relation and shown as a horizontal slot 24 and a vertical slot 26, said member 22 being carried by the disc 20. Pivotally mounted in the slot 24, as by pins 28, are a pair of arms 30 formed by medially folding a metal strip upon itself, said arms each enfolding a length of cable 32 to which there is secured a border of a net 34. Springs 36 coiled around and anchored on each of the pins 28, and having a leg thereof extending within the arms 30, yieldingly urge said arms laterally of the frame support member 22. Another arm 38, also formed by medially folding a metal strip upon itself, is pivotally mounted within the vertical slot 26 by a pin 40, said arm enfolding a length of cable 42 to which there is secured a portion of the net 34. A spring 44 coiled around and anchored on the pin 40, and having a leg thereof extending within the arm 38, is adapted to yieldingly urge said arm downwardly with respect to the frame support member 22.

An auxiliary arm 46, having the same U-shaped cross section as arms 30 and 38, is pivotally secured to the end of arm 38 by a pin 48, said arm being provided with a length of internal cable 50 (Figure 6) to which there is secured the lower edge of the net 34. A spring 52 coiled around the pin 48 and anchored thereon, and having a leg thereof abutting the arm 38, serves to yieldingly urge the arm 46 away from the arm 38 to the position shown in Figure 6. The arm 46 is secured to a threaded spindle 54 on which there is sleeved a multi-pronged centering member 56, a rubber sealing disc 58, and a backing disc 60, said centering member and discs being secured in place on the spindle 54 by a handling knob 62 adapted to be threadably engaged with the spindle.

The tube 10 has secured to the outer surface thereof a guard bracket 64 having a slot 66 in the upper portion thereof in which the smaller diametral portion of a slidable button 68 is adapted to move. A spring catch 70 secured at one end to the tube 10 is adapted to be depressed by a sliding of the button 68 in one direction to force the right-angled end 72 of said catch through an aperture 74 in the tube to lock the piston 14 against forward movement under the action of a spring 76 carried within the tube 10 between the closure cap 12 and the piston 14. The end 72 maintains a substantially water-tight fit in the aperture 74. A plurality of beads 78 projecting inwardly of the tube 10 adjacent the mouth thereof serve as stop members for the piston 14 to prevent movement of said piston out of the tube.

A support member indicated generally at 80 is comprised of a collar 82 in frictional engagement with the outer surface of the tube, an arm 84 secured to the collar, and a U-shaped spring clip 86 pivotally carried by the end of the arm 84. The clip 86 may be yieldingly moved out of engagement with the surface of the tube 10 by pivoting said clip counter-clockwise with respect to the end of arm 84, as viewed in Figures 1 and 2, to snap said clip off of the tube. The operator's belt, or the like, may then be introduced between the arm 84 and the tube 10 for the support of the landing net, and the clip may then be snapped back onto the tube to lock the landing net in place for carrying purposes.

When the elements of the landing net are in the retracted position of Figures 1 and 3, the rubber disc 58 seals the mouth of the tube 10 against the influx of water, should the device be accidentally dropped in a stream, or the like. This sealing disc together with the relatively light weight of the device, aluminum being preferably used for the fabrication thereof, combine to lend floatability to the device.

A manual sliding of the button 68 to the right from its position of Figures 1 and 3 allows the upward movement of the spring 70 to free the end 72 of the spring from engagement with the piston 14, thus causing a rapid movement of said piston to the mouth of the tube 10 under the action of spring 76, said movement of the piston 14 being stopped by the beads 78 adjacent the mouth of the tube. As the arms 30, 38 and 46 of the net frame are moved outwardly of the tube, they are pivoted away from the axis of the tube by springs 36, 44 and 52, respectively, to assume the positions shown in Figures 2 and 6–8, thus causing distension of the net 34, as shown best in Figure 8. The shorter end of the arm 46 and the knob 62 and attendant parts carried thereby serve as weight to aid the springs 44 and 52 in the maintenance of the distension of the apex of the net 34.

To return the landing net device to the closed position, the operator grasps the knob 62 and pivots the arms 46 and 38 simultaneously in a counter-clockwise direction, as viewed in Figure 8, around their respective pivot points, through the intermediate position of arms 46 and 38, shown in dotted outline in Figure 8, to bring both arms into alignment with the axis of tube 10, thereby enfolding the apex of net 34 between said arms. The forcing of the arms 46 and 38 inwardly of the tube against the action of spring 76 is effective to pivot the laterally disposed arms 30 towards each other by the forcing action of the tube mouth against said arms 30. The arms are moved inwardly until the disc 58 is in tight engagement with the end of the tube 10, and the button 68 is then moved to depress the end 72 of spring 70, thereby securing the piston 14 in the position of Figure 1. It will be noted that the pronged centering member 56 serves to maintain the arms of the net frame centrally of the tube and to center the disc 58 with respect to the mouth of said tube.

A modification of the net frame is shown in Figure 9, wherein the knob 62, disc 58, backing disc 60 and multi-pronged centering member 56 are secured directly to the arm 38 which is provided in a slightly longer length, and, also, adapted to have less of a downward pivoting action than the arm 38 of the preferred embodiment of the invention, thereby compensating to some degree for the absence of arm 46. It will be noted that the knob 62 and attendant parts carried by arm 38 serve as a weight in aid of the spring 44 for arm 38 in maintaining the distension of the apex of the net.

The floatability of the landing net when it is in the closed position has been heretofore mentioned, but it is to be pointed out that the landing net is also floatable when the elements thereof are in the extended position, as in Figure 2. Piston 14 is then effective to prevent the influx of water within the tube 10, thereby preserving the buoyancy of the tube if it should be accidentally dropped in the water.

While the preferred embodiment of the invention and a modification thereof have been shown and described, it is understood that further modification of the structure of the invention may be had within the spirit of the invention and the scope of the appended claims.

What we claim as new and desire to secure by Letters Patent is:

1. In a landing net device having a hollow handle, a piston fitted for sliding movement in said handle, a spring to urge said piston toward the mouth of the handle, and trigger means to initiate said spring-urged movement of the piston; a net supporting frame comprising arms pivotally secured to the piston in a tripodal arrangement, and spring means associated with said arms and piston adapted to distend said arms as the piston is urged to the mouth of the handle.

2. In a landing net device having a hollow handle, a piston fitted for sliding movement in said handle, a spring to urge said piston toward the mouth of the handle, and trigger means to initiate said spring-urged movement of the piston; a net supporting frame comprising a pair of arms pivotally secured to the piston for lateral movement with respect to the normal position of use of the device and another arm pivotally secured to the piston for downward movement with respect to said position of use, and spring means associated with each of said arms and said piston adapted to pivot said arms outwardly from the longitudinal axis of the handle upon the movement of the piston to the mouth of the handle.

3. A landing net device comprising a hollow handle, a piston fitted for sliding movement in said handle, three arms pivotally secured to said piston, two of said arms being laterally pivotable and the third arm being pivotable in a downward direction normal to the direction of pivot of said two arms, a net secured to said three arms, a spring to yieldingly urge said piston to the mouth of said handle, trigger means to initiate said movement, a spring associated with each of said arms and said piston to distend said arms upon the movement of said piston to the mouth of said handle, and a member carried at the end of the downwardly pivotable arm adapted to serve as a distending weight for the apex of the net when said net is in the extended position and to serve as a closure cap for the mouth of the handle when the net is in the retracted position within the handle.

4. A landing net device comprising a hollow handle, a piston fitted for sliding movement in said handle, three arms pivotably secured to said piston in tripodal arrangement, two of said arms being laterally pivotable and the third arm being pivotable in a downward direction normal to the plane embracing the longitudinal axes of said two arms, an auxiliary arm pivotably secured adjacent one end thereof to the end of the aforementioned downwardly pivotable arm, a net secured to and between said three arms and said auxiliary arm, a spring to yieldingly urge said piston to the mouth of said handle, trigger means to initiate said movement, a spring associated with each of said arms to distend the three tripodally arranged arms upon the movement of said piston to the mouth of said handle and to pivot the auxiliary arm to move the longer portion thereof away from the arm to which it is secured to a substantially horizontal position, said auxiliary arm being effective upon the manual return pivoting thereof to bring the longer portion of said arm adjacent its supporting arm to enfold the net for ready insertion of the net and arms within the handle, and a member carried at the end of the shorter portion of the auxiliary arm adapted to serve as a closure cap for the mouth of the handle when the net is in the retracted position within the handle.

5. For a landing net supporting device having a tripodal net frame extensible and retractable with respect to a supporting handle having arms, an auxiliary arm pivotably secured to the end of one of said arms, and spring means to urge said auxiliary arm out of parallelism with said one arm, said auxiliary arm having a portion of the net secured thereto and being adapted upon a forced pivoting thereof toward a position of parallelism with said one arm to enfold the net for ready retraction of the net and supporting frame with respect to the handle.

6. A landing net comprising a tubular handle having a substantially water-tight wall and one permanently sealed end, a piston mounted for movement in the handle and comprising a rubber disk in sealing engagement with the inner surface thereof, a net support carried by the piston comprising a plurality of pivotally related straight frame members supporting a net and movable out of and into the open end of the handle to expand or retract the net, and a closure for said end of the handle comprising a hand knob on the outer end of one frame member having a rubber disk at its base making sealing engagement with the open end of the handle when said one member is telescoped therein; whereby said closure and piston serve to exclude water from the handle in the retracted position and the open position, respectively, of the net and make the handle floatable.

THOMAS A. BEDFORD.
HENRY A. SCHMITT.

REFERENCES CITED

The following references are of record in the file of this patent:

UNITED STATES PATENTS

| Number | Name | Date |
|---|---|---|
| 482,635 | Hanish | Sept. 13, 1892 |
| 588,595 | Nolan | Aug. 24, 1897 |
| 985,114 | Covell | Feb. 21, 1911 |